(12) United States Patent
Tatar et al.

(10) Patent No.: US 11,320,446 B2
(45) Date of Patent: May 3, 2022

(54) CONDITION MONITORING SYSTEM

(71) Applicant: Aktiebolaget SKF, Gothenburg (SE)

(72) Inventors: Florin Tatar, Delft (NL); Victor Martinez, Madrid (ES); Hendrik Anne Mol, Sleeuwijk (NL); Feng Qiu, IJsselstein (NL)

(73) Assignee: Aktiebolaget SKF, Gothenburg (SE)

( * ) Notice: Subject to any disclaimer, the term of this patent is extended or adjusted under 35 U.S.C. 154(b) by 208 days.

(21) Appl. No.: 16/423,350

(22) Filed: May 28, 2019

(65) Prior Publication Data

US 2019/0391174 A1 Dec. 26, 2019

(30) Foreign Application Priority Data

Jun. 22, 2018 (EP) .................................. 18380005

(51) Int. Cl.
| | |
|---|---|
| *G01M 13/045* | (2019.01) |
| *G01P 3/44* | (2006.01) |
| *B61L 15/00* | (2006.01) |
| *F16C 41/00* | (2006.01) |
| *G01M 13/04* | (2019.01) |

(52) U.S. Cl.
CPC .......... *G01P 3/443* (2013.01); *B61L 15/0018* (2013.01); *F16C 41/008* (2013.01); *G01M 13/04* (2013.01); *B61L 2205/04* (2013.01); *F16C 2233/00* (2013.01)

(58) Field of Classification Search
CPC ..... G01P 3/443; G01M 13/04; G01M 13/045; B61L 15/0018; B61L 2205/04; G01H 11/02; F16C 2233/00
See application file for complete search history.

(56) References Cited

U.S. PATENT DOCUMENTS

| | | | | |
|---|---|---|---|---|
| 10,974,740 | B2* | 4/2021 | Jenart | B61F 15/12 |
| 2015/0355075 | A1* | 12/2015 | Murray | F16C 33/78 |
| | | | | 384/448 |
| 2016/0195453 | A1* | 7/2016 | Erskine | G01M 13/04 |
| | | | | 73/865.8 |
| 2016/0254725 | A1* | 9/2016 | Angelis | F16C 41/004 |
| | | | | 310/156.08 |
| 2017/0210401 | A1 | 7/2017 | Mian | |
| 2018/0149205 | A1* | 5/2018 | Den Haak | F16C 41/004 |
| 2018/0361789 | A1* | 12/2018 | Gunji | B60B 35/16 |
| 2019/0391049 | A1* | 12/2019 | Jones | G01M 5/0058 |

FOREIGN PATENT DOCUMENTS

| | | |
|---|---|---|
| GB | 2096770 A | 10/1982 |
| WO | 2013159837 A1 | 10/2013 |
| WO | 2017086785 A1 | 5/2017 |

* cited by examiner

*Primary Examiner* — Alexander A Mercado
(74) *Attorney, Agent, or Firm* — Garcia-Zamor Intellectual Property Law; Ruy Garcia-Zamor; Bryan Peckjian

(57) ABSTRACT

A condition monitoring system for monitoring a rolling element bearing. The system includes a signal processing unit and a vibration energy harvester. The vibration energy harvester provides an electromagnetic transducer. When vibrated, a coil moves relative to a static electromagnetic field to create power. To create a compact and efficient condition monitoring system, it uses the electromagnetic transducer also as a vibration sensor, a velocity sensor. The signal processing unit determines if the bearing has been damaged and in some embodiments also the extent of the damage. The electromagnetic transducer is attached directly or indirectly to the rolling element bearing.

12 Claims, 1 Drawing Sheet

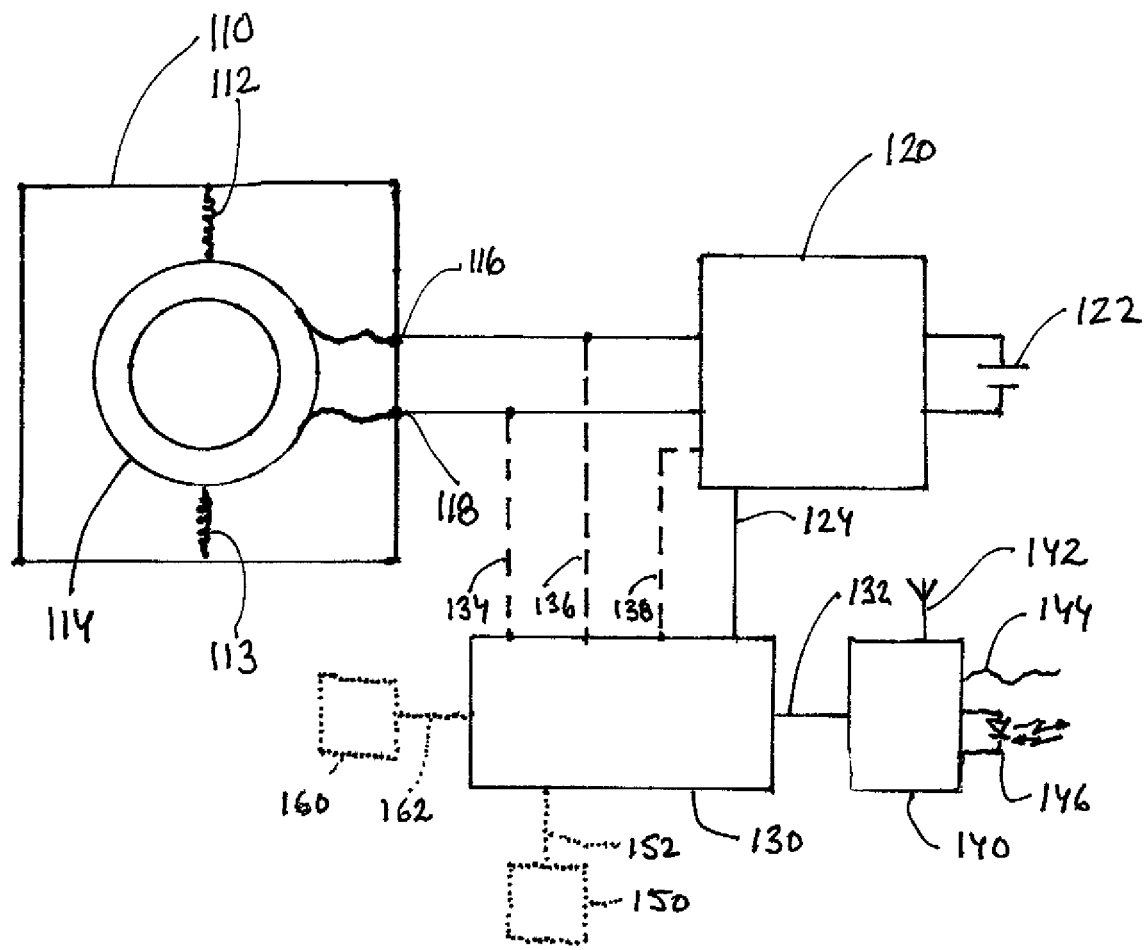

CONDITION MONITORING SYSTEM

CROSS-REFERENCE

This application claims priority to European patent application no. EP18380005 filed on Jun. 22, 2018, the contents of which are fully incorporated herein by reference.

TECHNOLOGICAL FIELD

The invention concerns condition monitoring system and is more particularly directed to a compact and efficient condition monitoring system of roller bearings, especially railway bearings.

BACKGROUND

A rolling element bearing comprises an inner ring, an outer ring and several rolling elements or bodies installed between these two rings. These rolling elements can be balls, rollers or needles. In the meaning of the invention, a rolling bearing and a rolling element bearing can be, for instance, a ball bearing, a roller bearing or a needle bearing.

In the field of rolling element bearings, it is known to attach one or more sensors to measure one or more physical parameters and transduce these physical parameters into electrical signals. One such example is the use of a vibration sensor, traditionally a piezo electric acceleration sensor, in order to determine bearing damage. In many applications there is a desire to have condition monitoring for one or more bearings autonomously for several years. This requirement has forced development of extremely low power signal processing and adding large battery packs. An additional requirement is usually that everything has to be very small and compact to fit the application, such as condition monitoring of railway bearings. This has resulted in that the development has turned to energy harvesting, and lately vibration energy harvesting. There is a constant problem of creating compact energy efficient autonomous condition monitoring systems. There is still room for improvements.

SUMMARY

An object of the invention is to define an autonomous condition monitoring system.

The aforementioned object is achieved according to the invention by a rolling element bearing condition monitoring system. The system comprises a signal processing unit and a vibration energy harvester. The vibration energy harvester comprises an electromagnetic transducer wherein when vibrated a coil moves relative to a static electromagnetic field to create power. To create a compact and efficient condition monitoring system, it uses the electromagnetic transducer also as a vibration sensor, a velocity sensor. The signal processing unit determines if the bearing comprises a damage and in some embodiments also the extent of the damage. The electromagnetic transducer is suitably attached directly or indirectly to the rolling element bearing.

The aforementioned object is also achieved according to the invention by a rolling element bearing condition monitoring system. The condition monitoring system comprises an energy harvester and a signal processing unit. The energy harvester comprises an electromagnetic transducer and in most embodiments also a power management unit. The electromagnetic transducer transduces vibrations subjected to it, over a frequency bandwidth of 100 Hz or more, to an electrical voltage by means of a coil moving relative to a static electromagnetic field due to the vibrations. The electromagnetic transducer is suitably attached/connected directly or indirectly to the rolling element bearing. The power management unit, if present, will comprise circuitry to properly charge and discharge an energy storage unit, comprise circuitry to provide power consumers with power with correct voltage, comprise protection circuitry and possibly also circuitry that can provide an output with a value of power level that the electromagnetic transducer currently produces and a value of base power level that the electromagnetic transducer has produced over a predetermined period time.

The signal processing unit determines a condition of the rolling element bearing and according to the invention this determination is done by means of the electrical voltage from the electromagnetic transducer, either directly and/or indirectly. Indirectly by using the power level and base power level determined by the power management unit, and/or directly by processing the electrical voltage from the electromagnetic transducer.

In some embodiments the signal processing unit determines or calculates a vibration level and a base vibration level the electromagnetic transducer is subjected to. The determinations or calculations are done by means of the electrical voltage level from the electromagnetic transducer. A value of vibration level is the magnitude that the electromagnetic transducer is currently subjected to, can be an average over a short predetermined period of time, and a value of base vibration level is the magnitude that the electromagnetic transducer has on average been subjected to over a long predetermined period time. In some of these embodiments the system may further comprise a GPS to acquire speed and location, or the system can alternatively acquire speed and possibly location from an external device, such as another close by condition monitoring system. The signal processing unit in these embodiments determines the base vibration level also in dependence of speed and if available location. When it comes to railway bearings, location can be advantageous to know if there is track damage to then be able to determine where this track damage is located. Location can also be advantageous to know and identify good/quiet track where it is thus easier to detect and determine bearing or wheel damage, with no or at least less noise/vibrations from the track. Suitably the signal processing unit determines that there is a damage if the vibration level unexpectedly rises, by a damage predetermined value or more. The vibration level will vary depending on rotational speed, while cyclical variations or sporadic variations of vibration levels are not expected. If the rolling element bearing is not a railway bearing, such as a truck or other vehicle bearing, then the signal processing unit can determine that if there is a cyclical rise in the vibration level, by the damage predetermined value or more, above the base vibration level then the damage is a bearing damage. On the other hand, if the rolling element bearing is a railway bearing then the signal processing unit can determine that:

if there is a cyclical moderate rise in the vibration level, by a first predetermined value or more up to a second predetermined value, above the base vibration level then the damage is a bearing damage;

if there is a cyclical large rise in the vibration level, by the second predetermined value or more, above the base vibration level then the damage is a wheel flat damage, the cyclical large rise value being at least twice the cyclical moderate rise value; and if there is a sporadic rise in the vibration level, by a third predetermined value or more, above the base vibration level then the damage is a track damage.

In other embodiments the signal processing unit or the energy harvester determines or calculates a power level of the electromagnetic transducer by means of the electrical voltage from the electromagnetic transducer, can be an average over a short predetermined period of time. The signal processing unit or the energy harvester unit will then also determine a base power level from the electrical voltage from the electromagnetic transducer, suitably an average over a long predetermined period of time. The power level is what the electromagnetic transducer currently produces and the base power level is what the electromagnetic transducer has on average produced over a long predetermined period time. In some embodiments the system further comprises a GPS to acquire speed and location, or the system possibly acquires speed and possibly location from an external device, such as a close by condition monitoring system with a GPS. Suitably the signal processing unit or the energy harvester then determines the base power level in dependence of speed and if available location. The signal processing unit then determines that there is a damage if the power level unexpectedly rises, by a damage predetermined value or more. The power level will vary depending on rotational speed, while power level changes, by the damage predetermined value or more, due to cyclical variations or sporadic variations, are not expected. If the rolling element bearing is not a railway bearing, such as a truck or other vehicle bearing, then the signal processing unit can determine that if there is a cyclical rise in the power level above the base power level, by the damage predetermined value or more, then the damage is a bearing damage. On the other hand, if the rolling element bearing is a railway bearing then the signal processing unit determines that:

if there is a cyclical moderate rise in the power level, by a first predetermined value or more up to a second predetermined value, above the base power level then the damage is a bearing damage;

if there is a cyclical large rise in the power level, by the second predetermined value or more, above the base power level then the damage is a wheel flat damage, the cyclical large rise being at least twice the cyclical moderate rise; and if there is a sporadic rise in the power level, by a third predetermined value or more, above the base power level then the damage is a track damage.

Advantageously the electromagnetic transducer acts as a velocity sensor thereby enabling the signal processing unit in some embodiments to integrate the electrical voltage of the electromagnetic transducer to get a change in displacement. By knowing changes of displacement the signal processing unit can determine a size of a damage by determining when a damage starts (displacement increases) and when a damage ends (displacement decreases). In some embodiments the change in displacement has to be above a predetermined displacement value to be considered a change in displacement, for example to avoid reacting on noise. There can even be different predetermined values for displacement increase and displacement decrease.

The different additional enhancements of the condition monitoring system according to the invention can be combined in any desired manner as long as no conflicting features are combined.

Other advantages of this invention will become apparent from the detailed description.

BRIEF DESCRIPTION OF THE DRAWINGS

The invention will now be described in more detail for explanatory, and in no sense limiting, purposes, with reference to the following FIGURE, in which FIG. 1 illustrates a condition monitoring system according to the invention.

DETAILED DESCRIPTION

In order to clarify the method and device according to the invention, some examples of its use will now be described in connection with FIG. 1.

FIG. 1 illustrates a condition monitoring system according to the invention comprising an electromagnetic transducer unit 110 of a vibration energy harvester, and a signal processing unit 130. The electromagnetic transducer unit 110 comprises a coil 114 comprising a first and a second coil connections 116, 118, which coil 114 is suspended in a static magnetic field created by permanent magnets (not shown). The coil 114 is suspended by at least one spring 112, suitably two 112, 113, or more. Vibrations that the electromagnetic transducer unit 110 is subjected to, will create movement of the coil 114 in relation to the static magnetic field thereby creating an electromotive force in the coil 114 to appear as a voltage across the two coil connections 116, 118. The two or more springs 112, 113 are arranged in such a way that the coil stays more or less in the same place in space when the electromagnetic transducer unit vibrates, and in such a way that the transfer function of vibration frequency to emf/voltage is fairly linear over its operating range, typically fairly flat up to around 100 Hz and then slowly declining to a cutoff at about 400 Hz. The electromagnetic transducer is thus not resonant within its operating frequency range, but works on the principle of generating a good output, fairly linear, over a very broad frequency spectrum of vibrations. Further details about a vibration energy harvester of the type that can be used in this invention, can be read about in WO 2017/086785. According to the invention, the electromagnetic transducer is used for both power harvesting and as a vibration sensor. As a vibration sensor the electromagnetic transducer functions as a velocity sensor. In other embodiments the harvesting coil and the permanent magnets can switch places, that is the permanent magnets are then suspended by one or more springs.

In the illustrated embodiment, the harvesting coil 114 is used for both vibration energy harvesting and vibration sensing. In other slightly modified embodiments, there can be two separate coils, suitably wound together, one used for energy harvesting and the other coil used for vibration sensing.

To make the energy harvester complete, the coil connections 116, 118 are coupled to the power management unit 120, which will charge an energy storage unit 122 and provide a regulated power output 124 to power consumers such as the signal processing unit 130. The energy storage unit 122 may for example be a capacitor, a rechargeable battery, or the like that can be charged and discharged.

According to the invention the electromagnetic transducer unit 110 of the energy harvester is not only used for energy harvesting, but is also used as a velocity sensor. The signal processing unit 130 according to the invention will acquire coil voltage signals from the electromagnetic transducer unit 110 either by means of sensing connections 134, 136 with the power harvesting coil connections 116, 118 or if a separate sensor coil is available, sensing connections 134, 136 with sensor coil connections. Alternatively or in addition, measurement signals can be acquired by means of a sensing connection 138 to the power management unit 120 for acquiring how much power the electromagnetic transducer unit 110 is generating.

The signal processing unit 130 also comprises a communication unit 140 to be able to communicate the condition of a bearing to an end user, such as a maintenance engineer, to a concentrator for further transmission to a central condition monitoring system or control system, or a communication network for transfer of the condition of a bearing. Communication can be either wireless by radio 142 or optical 146, or wired 144, or any combination of these. In one embodiment there might be an LED that turns on when there is a damage and goes from yellow, through orange and finally red to indicate the severity. Another embodiment might only communicate with a radio transceiver. A further embodiment might have optical and radio, while still a further might also add wired, for example in the sense that there is a connector that a maintenance engineer can connect to get further information about the damage and perhaps also charge the energy storage unit.

In some embodiments there is an optional accelerometer sensor 150 coupled 152 to the signal processing unit 130. Piezo electric accelerometer sensors are traditionally used as bearing vibration sensors. By filtering and analyzing the vibration signals from an accelerometer sensor, it is possible to identify that there is bearing damage, but the size of the damage can only be derived up to a few millimeters, typically 1.2 mm on a railway bearing. This is can be done since up to that damage dimension the output of the sensor is rising, and above that damage dimension the output is no longer increasing, making it impossible to determine any further growth of the damage. In train applications it is necessary to understand the damage growth up to a centimeter range, and have therefore up to now relied on manual visual inspections even though the bearings are equipped with traditional condition monitoring equipment with accelerometer vibration sensors. By using the electromagnetic transducer 110 not only as a power harvester, but also as a sensor according to the invention, the signal processing unit 130 has access to a velocity sensor. By just one simple integration of the electromagnetic transducer 110 output, it is possible to determine displacement, which in turn makes it possible to determine damage growth into the centimeter range. This is done by determining when a roller or ball goes into the damage by displacement change and then when the roller or ball exits by determining a further displacement change.

The signal processing unit may optionally have a connection 162 with a GPS unit 160. A GPS unit 160 may be very useful if the condition monitoring system is mounted on a moving object, monitoring for example train/railway bearings or other vehicle bearings. The connection 162 may be wired or wireless. A GPS can thus keep track of where measurements are taken, for example identify the location of identified damaged railway track, if monitoring railway bearings. The invention is especially useful for condition monitoring of railway bearings as it can in addition to identify bearing damage, it can also identify wheel damage, wheel flats, and track damage. Just looking at the power output of the electromagnetic transducer, in railway applications in a specific embodiment, if there is an increase in power output of around 1 to 3 mW, then this is an indication that there is a bearing damage, if there is an increase in power output of more than 6 mW, then this is an indication that there is a wheel flat. Wheel flats and bearing damage will be cyclic with a repetition frequency proportional to speed (if there is a GPS, speed will be available), while track damage will appear randomly, and on all wheel bearings on the same side/track, which can then be correlated.

According to the invention a novel way of using an electromagnetic transducer as a velocity sensor in addition to it being used as a power harvester for an energy harvester is presented. Most vibration based energy harvesters are limited to harvesting only a very small frequency bandwidth of vibrations due to them being resonance systems. This makes them suitable for harvesting energy where vibrations are within a well-defined narrow frequency bandwidth, such as machinery rotating at fixed speeds, and likewise unsuitable for machinery with varying speed. The current invention makes use of an electromagnetic transducer which can harvest power from a broad frequency band of vibrations, making the energy harvester suitable for varying speed applications such as railway applications, and also suitable for use as a velocity sensor.

The invention is based on the basic inventive idea of bearing damage, as well as wheel flats and track damage in railway applications, cause vibrations and these will create an addition of power for a vibration energy harvester that can then be detected by the variation in power harvested by the vibration energy harvester. The invention is not restricted to the above-described embodiments, but may be varied within the scope of the following claims.

FIG. 1 illustrates a condition monitoring system according to the invention:
110 Electromagnetic transducer unit of energy harvester,
112 Non-linear spring,
113 Non-linear spring,
114 Coil and possibly additional mass,
116 First coil connections,
118 Second coil connection,
120 Power management unit,
122 Energy storage unit, such as a capacitor or rechargeable battery,
124 Regulated power output to power consumers such as a signal processing unit,
130 Signal processing unit,
132 Signal processing output to a communication unit,
134 Possible sensing connection with first energy harvesting coil connection or with first sensor coil connection,
136 Possible sensing connection with second energy harvesting coil connection or with second sensor coil connection,
138 Possible sensing connection with power management unit,
140 Communication unit,
142 Antenna for wireless communication,
144 Wired communication,
146 Optical wireless communication,
150 Optional accelerometer/vibration sensor,
152 Optional accelerometer/vibration sensor signal connection with signal processing unit.
160 Optional GPS unit,
162 Optional GPS signal connection with signal processing unit,

What is claimed is:

1. A condition monitoring system of a rolling element bearing, the system comprising:
   an energy harvester comprising an electromagnetic transducer, where the electromagnetic transducer transduces vibrations subjected to it, over a frequency bandwidth of 100 Hz or more, to an electrical voltage by means of a coil moving relative to a static electromagnetic field due to vibrations;

a signal processing unit that determines a condition of the rolling element bearing;

the electromagnetic transducer being attached directly or indirectly to the rolling element bearing, wherein the signal processing unit determines the condition of the rolling element bearing by means of the electrical voltage from the electromagnetic transducer, wherein the signal processing unit determines or calculates a vibration level and a base vibration level the electromagnetic transducer is and has been subjected to by means of the electrical voltage from the electromagnetic transducer.

2. The condition monitoring system according to claim 1, wherein the system further comprises a GPS to attain speed and location, or the system attains at least one of the group of speed and location from an external device, and in that the signal processing unit determines the base vibration level also in dependence of speed.

3. The condition monitoring system according to claim 1, wherein the signal processing unit determines that there is damage if the vibration level rises.

4. The condition monitoring system according to claim 3, wherein if the rolling element bearing is a railway bearing then the signal processing unit determines that:
if there is a first cyclical rise in the vibration level above the base vibration level by at least a first predetermined value up to a second predetermined value then the damage is a bearing damage;
if there is a second cyclical rise in the vibration level above the base vibration level by an amount greater than the second predetermined value up to a third predetermined value then the damage is a wheel flat damage, the second cyclical rise being at least twice the first cyclical rise; and
if there is a third rise in the vibration level above the base vibration level by an amount greater than a third predetermined value then the damage is a track damage.

5. A condition monitoring system of a rolling element bearing, the system comprising:
an energy harvester comprising an electromagnetic transducer, where the electromagnetic transducer transduces vibrations subjected to it, over a frequency bandwidth of 100 Hz or more, to an electrical voltage by means of a coil moving relative to a static electromagnetic field due to vibrations;
a signal processing unit that determines a condition of the rolling element bearing;
the electromagnetic transducer being attached directly or indirectly to the rolling element bearing, wherein
the signal processing unit determines the condition of the rolling element bearing by means of the electrical voltage from the electromagnetic transducer, wherein the signal processing unit or the energy harvester determines or calculates a power level of the electromagnetic transducer by means of the electrical voltage from the electromagnetic transducer, and the signal processing unit or the energy harvester determines a base power level from the electrical voltage from the electromagnetic transducer.

6. The condition monitoring system according to claim 5, further comprising a GPS to attain speed and location, or the system attains at least one of the group of speed and location from an external device, and in that the signal processing unit determines the base power level in dependence of speed.

7. The condition monitoring system according to claim 5, wherein the signal processing unit determines that there is a damage if the power level rises.

8. The condition monitoring system according to claim 7, wherein if the rolling element bearing is a railway bearing then the signal processing unit determines that:
if there is a first cyclical rise in the power level above the base power level by at least a first predetermined value up to a second predetermined value then the damage is a bearing damage;
if there is a second cyclical rise in the power level above the base power level by an amount greater than the second predetermined value up to a third predetermined value then the damage is a wheel flat damage, the second cyclical rise being at least twice the first cyclical rise; and
if there is a third rise in the power level above the base power level by an amount greater than a third predetermined value then the damage is a track damage.

9. A condition monitoring system of a rolling element bearing, the system comprising:
an energy harvester comprising an electromagnetic transducer, where the electromagnetic transducer transduces vibrations subjected to it, over a frequency bandwidth of 100 Hz or more, to an electrical voltage by means of a coil moving relative to a static electromagnetic field due to vibrations;
a signal processing unit that determines a condition of the rolling element bearing;
the electromagnetic transducer being attached directly or indirectly to the rolling element bearing, wherein
the signal processing unit determines the condition of the rolling element bearing by means of the electrical voltage from the electromagnetic transducer, wherein the electromagnetic transducer acts as a velocity sensor thereby enabling the signal processing unit to integrate the electrical voltage of the electromagnetic transducer to get a change in displacement enabling the signal processing unit to determine a size of a damage by determining when a damage starts and when a damage ends.

10. A condition monitoring system of a rolling element bearing, the system comprising:
an energy harvester comprising an electromagnetic transducer, where the electromagnetic transducer transduces vibrations subjected to it, over a frequency bandwidth of 100 Hz or more, to an electrical voltage by means of a coil moving relative to a static electromagnetic field due to vibrations, wherein the electrical voltage represents both the vibrations to which an associated bearing is subject;
a signal processing unit that determines a condition of the rolling element bearing;
the electromagnetic transducer being attached directly to the rolling element bearing, wherein the signal processing unit determines the condition of the rolling element bearing based on the vibrations of the bearing by means of the electrical voltage from the electromagnetic transducer;
wherein the system further comprises a GPS to attain speed and location and the signal processing unit determines a base vibration level also in dependence of speed and location.

11. The condition monitoring system according to claim 10, wherein the signal processing unit determines that there is damage if the vibration level exceeds a predetermined threshold.

12. The condition monitoring system according to claim 11, wherein the rolling element bearing is a railway bearing, the signal processing unit determines that:
   if there is a cyclical rise in the vibration level by a first predetermined amount above the base vibration level then the damage is a bearing damage;
   if there is a cyclical rise in the vibration level above the base vibration level by a second predetermined amount then the damage is a wheel flat damage, the cyclical large rise being at least twice the cyclical moderate rise; and
   if there is a rise in the vibration level above the base vibration level which is not cyclical then the damage is a track damage.

* * * * *